3,684,662
MULTIPLE-STAGE FLASH EVAPORATOR
Robert Simpson Silver, Glasgow, Scotland, assignor to Weir Westgarth Limited, East Kilbride, Scotland
Filed Nov. 14, 1969, Ser. No. 876,729
Claims priority, application Great Britain, Nov. 16, 1968, 54,493/68
Int. Cl. B01d 1/28, 3/02, 3/00, 3/06, 3/10; C02b 1/04
U.S. Cl. 202—173   2 Claims

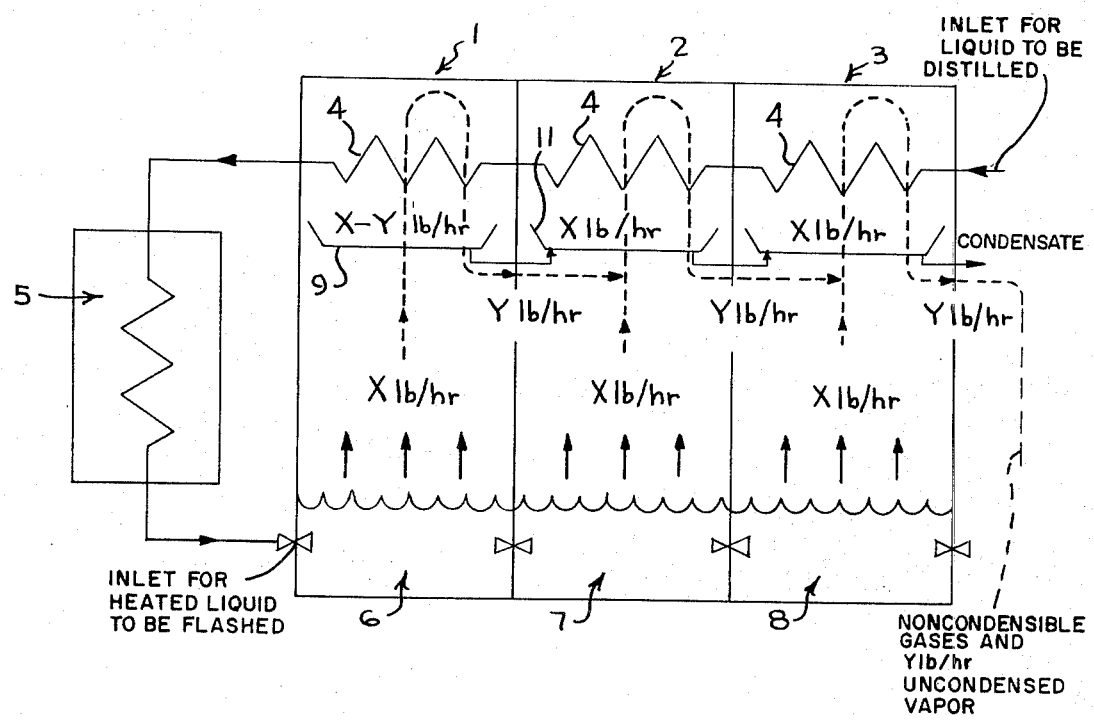

ABSTRACT OF THE DISCLOSURE

A multiple-stage flash evaporator in which the liquid to be distilled first passes through a heater located in the vapour space of a flash chamber in each of a plurality of stages of the evaporator and after being further heated subsequent to the last vapor space is introduced into the first flash chamber to flow through the flash chambers counter to or transversely of the flow of liquid being heated and partly flashes into vapour in said chambers, a substantial proportion of the vapour formed in the flash chamber of one stage being passed uncondensed to another stage.

---

This invention relates to an improved multiple-stage flash evaporator of the kind in which feed liquid, such as brine, from which a distillate, such as fresh water, is to be distilled first passes through a heater located in the condensing section located in the vapour space of a flash chamber in each of a plurality of stages of the evaporator, and after being subsequently heated to the required temperature, is introduced into the first flash chamber to flow through each flash chamber counter to or transversely of the flow of liquid being heated and partly flashes into vapour in said chambers, the vapour part being condensed therein on said heater as a liquid distillate.

It was customary, heretofore, to cause substantially all the vapour produced in the flash chamber of any stage to condense on a condensing surface provided in that stage, although a small proportion, usually less than 1%, of the vapour was always uncondensed and passed to a subsequent stage.

It is an object of the present invention to render easier the removal from the evaporator of non-condensable waste gases.

The present invention is an evaporator, of the kind referred to, including means for passing a substantial proportion of the vapour formed in the flash chamber of each stage uncondensed to another stage.

The proportion of vapour passed uncondensed from each stage is not less than 5% and not greater than 25% of the vapour formed in that stage.

Preferably, means is provided for passing a proportion of the vapour formed in each stage to the next stage in sequence.

An embodiment of the present invention will now be described by way of example, with reference to the accompanying drawing which is a diagrammatic representation of a multiple-stage flash evaporator.

A flash evaporator is provided which is supplied with liquid, such as brine, from which a distillate, such as fresh water is to be distilled.

The flash evaporator is of the kind which comprises a plurality of stages 1, 2, 3 each of which has a flash chamber. The liquid first passes to be heated through a heater in the form of a tubular heat exchanger 4 located in the vapour space of each flash chamber. After being heated to a required temperature in a heat input section 5, the liquid is introduced into the flash chamber 6 of the first stage 1. Part of the liquid in the flash chamber 6 of the first stage 1 flashes into vapour, say X lb./hr., the remaining non-distilled liquid being passed into the flash chamber 7 of the next lower pressure stage 2.

Approximately 75% of the vapour produced in the first flash chamber 1 is allowed to condense on a condensing surface 4 provided in the vapour space of the first flash chamber 1, the liquid distillate produced being led off separately in any suitable manner (not illustrated) from the remaining non-distilled liquid. The remaining 25% of the vapour produced in the first flash chamber, say Y lb./hr. is fed without condensing through a device generally shown at 10 into the vapour space of the next lower pressure flash chamber 2, together with non-condensable gases.

In the next lower pressure flash chamber, the non-distilled liquid passed from the previous flash chamber partly flashes into vapour, again say X lb./hr.

Approximately 75% of the vapour produced is allowed to condense together with the overflow vapour Y lb./hr. from the previous flash chamber on the condensing surface 4 provided in the vapour space of the flash chamber 7 of the second stage 2. The remaining 25% of the vapour again Y lb./hr. produced in the second flash chamber 7 is fed without condensing together with non-condensable gases into the vapour space of the lower pressure flash chamber 8 and the non-distilled liquid remaining from the second flash chamber 7 is also passed separately into the next lower pressure flash chamber 8.

The construction and operation of the remaining stages is similar to that of the second stage, approximately 25% of the vapour produced in a stage being passed uncondensed together with the non-condensable waste gases to the vapour space of the next lower pressure stage, or, in the case of the lowest pressure stage, drawn off. The maintained velocity of vapour and non-condensable gases throughout the condensing region allows the gases to be drawn off more effectively.

Since a portion of the vapour in the first stage is drawn off uncondensed, here Y lb./hr., the temperature rise of the circulating liquid in the tubular heat exchanger 4 of that stage is reduced as compared with the temperature rise of the circulating liquid in each of the remaining stages. Assuming that the same quantity of liquid is flashed into vapour in each stage, the temperature rise of the circulating liquid in each of the remaining stages is the same, that is given the same quantity of liquid flashed into vapour in each stage, and the same quantity of circulating liquid passing through the tubular heat exchanger in each stage, the temperature rises in all the subsequent stages after the first are all substantially equal since each receives the percentage of vapour allowed to pass from the upper stage as well as losing the percentage of vapour allowed to pass into the next lower pressure stage. It is only the uppermost stage which has a net deficiency because vapour is allowed to pass from it without any corresponding amount entering from an upper stage. Hence the temperature rise there is lower than in the others.

It is to be understood that the proportion of vapour produced in a stage which is passed uncondensed to the next stage or the actual quantity of uncondensed vapour passed on may vary from stage to stage, but it is considered that the proportion which passes from one stage to the next should exceed 10% of the vapour formed in that stage, although in certain circumstances said proportion may only exceed 5% of the vapour formed in the stage. It is to be understood, however, that even where the proportion of uncondensed vapour which is passed from one stage to another stage is as low as 5% of the vapour formed in said one stage, said proportion is, in the kind of evaporator with which the invention is concerned, substantial as compared with the small proportion of uncondensed vapour which is unavoidably passed from one stage to another in a known evaporator.

Although the invention has been described with reference to an evaporator in which the circulating liquid is heated by passing it through all the heaters in the stages in sequence it may be used in connection with other flash evaporators, such as disclosed in my prior British Patent No. 1,115,393.

I claim:

1. A multistage flash evaporator each stage of which comprises a flash chamber, a vapour space in the flash chamber and a vapour condensing section in said vapour space, a feed preheater and a distillate collection means located in said condensing section supply means for liquid to be distilled connecting to the first of said preheaters, a heat input section in fluid communication with said preheaters, inlet means for supplying said heated liquid from said heat input section to the first flash chamber, whereby the liquid partly flashes into vapour in each chamber, and bleed means for passing not less than 5% and not greater than 25% of the vapour formed in the flash chamber of each stage uncondensed to the vapour space of the chamber of the next lower pressure stage to increase the vapour and consequently the non-condensable gas flow rate in said condensing spaces, and means for removing the non-condensable gases and remaining associated vapor from the lowest pressure stage.

2. A method of distilling liquid in a multistage flash evaporator in which not less than 5% and not greater than 25% of the vapour formed in the flash chamber of each stage is passed uncondensed with the non-condensable gases from the condensing space of the flash chamber to the condensing space of the next lower pressure stage whereby the rate of removal of said non-condensable gases from each of said chambers is increased, and removing the non-condensable gases and remaining associated vapour from the lowest pressure stage.

References Cited

UNITED STATES PATENTS

| | | | |
|---|---|---|---|
| 3,099,607 | 7/1963 | Lustenader et al. | 203—10 |
| 3,180,805 | 4/1965 | Chirico | 159—2 MS X |
| 3,351,120 | 11/1967 | Goeldner et al. | 159—13 B |
| 3,206,379 | 9/1965 | Hill | 202—173 X |
| 3,245,762 | 4/1966 | Ullrich et al. | 202—173 X |

NORMAN YUDKOFF, Primary Examiner

J. SOFER, Assistant Examiner

U.S. Cl. X.R.

159—2 MS; 203—11, 88